United States Patent [19]

Johnson

[11] 4,208,098

[45] Jun. 17, 1980

[54] ODOR DISPENSING SYSTEM FOR HAND-HELD STEREOSCOPIC VIEWER AND REPLACEABLE CONTAINER THEREFOR

[76] Inventor: Frank Johnson, 358 Alida Way, #3, South San Francisco, Calif. 94080

[21] Appl. No.: 868,202

[22] Filed: Jan. 9, 1978

[51] Int. Cl.$^{2}$ .............................................. G02B 27/22

[52] U.S. Cl. ........................................ 350/134; 40/407

[58] Field of Search ........................... 40/407, 362–365; 352/85; 239/53–60; 350/133

[56] References Cited

U.S. PATENT DOCUMENTS

| | | | |
|---|---|---|---|
| 1,954,893 | 4/1934 | Saeks | 239/53 |
| 3,888,416 | 6/1975 | Lin | 239/60 X |
| 3,967,880 | 7/1976 | Johnson | 350/133 |

*Primary Examiner*—John K. Corbin
*Assistant Examiner*—Scott J. Sugarman
*Attorney, Agent, or Firm*—Julian Caplan

[57] ABSTRACT

For advertising or amusement purposes, a hand-held stereoscopic viewer is provided with a cavity into which a container may be inserted and removed. The cavity is located adjacent the nostrils of a user of the viewer and is separated from the other portions of the viewer and is capable of being enclosed. The container carries an odor-producing substance which may be a solid or a gel or a liquid absorbed into a suitable material. The container has a replaceable seal and when sealed inhibits odor essences escaping before or between uses. In use, the seal is removed from the container and it is inserted into the cavity. As the odor is produced, it reaches the atmosphere adjacent the nostrils of a user of the stereo viewer through odor-passage holes positioned between said odor-producing substance and the nostrils. These odor-passage holes can be positioned in the container or in a lid covering the enclosed cavity in or on the viewer. Scenes viewed in the stereo viewer can be compatible or associated with the odor provided and dispensed.

3 Claims, 11 Drawing Figures

ODOR DISPENSING SYSTEM FOR HAND-HELD STEREOSCOPIC VIEWER AND REPLACEABLE CONTAINER THEREFOR

This invention relates to a new and improved odor dispensing system for hand-held stereoscopic viewers and a replaceable container of odor-producing substance for use in such a system.

Reference is made to U.S. Pat. No. 3,967,880 which illustrates, describes and claims an advertising and sales promotion method and apparatus having certain advantages and objects, several of which are equally applicable to the present invention. In essence, my prior patent is an improvement on an inexpensive, commercially available stereoscopic picture viewer which is hand-held for viewing. The improvement provides apparatus and means for dispensing an odor capable of being representative of the stereo scenes being viewed. For example, if pictures of new cars are being viewed, the odor dispensed could be that of a "new car smell" thus providing the simultaneous sensory stimulation and pleasure of a new car smell with the stereo viewing of new car pictures. Various food products may be similarly viewed and smelled simultaneously. Outside the field of advertising, the invention has use in amusement and entertainment. Prior U.S. Pat. No. 3,967,880 lists many additional advantages and objects of such an odor presence and stereo viewing capability.

The present invention has certain advantages over the structure previously disclosed. One principal advantage is the fact that the odor-producing substance is dispensed from a container which may be inserted into a cavity in or on a modified stereo viewer and said container is removable and replaceable. Thus the present invention permits that no odor, or one odor, or different ordors can be dispensed from a single viewer over a brief time period, each odor capable of being smelled simultaneously with viewing of compatible stereo scenes.

Another principal advantage is that the odor-releasing means is optional and manual and is accomplished by removing a seal when desired, and is no longer mechanical and attached to the operating parts of the stereo viewer. This technique also provides that the container of odor-substance can be resealed between uses thus prolonging the use of the odor.

Prior U.S. Pat. No. 3,967,880 disclosed a pouch containing an odor-producing liquid which was opened by a knife connected to the mechanism of the stereo viewer. Such a knife-opening means has a number of disadvantages which are overcome in the present invention. One disadvantage of such construction is the fact that it is expensive and complicated to manufacture the odor-dispensing apparatus so as to be removable and replaceable and capable of dispensing more than one odor from a single viewer or replenishing an odor once it has been dispensed. Another disadvantage is the hazard such an exposed knife presents to a child's fingers should the odor dispensing system of the prior patent be made capable of a change of odors. Still another disadvantage is that the knife is contaminated with the odor liquid contained in a pouch when it has opened same, and this contamination degrades the particular odor of a subsequent use of the device as it could be modified to be capable of dispensing more than one odor.

A further disadvantage of the prior apparatus is the fact that the odor produced by the odor liquid is not wholly dispensed into the atmosphere adjacent the nostrils of a user of the stereo viewer. Instead, odor essences can escape into the viewer mechanism and thus disperse through various openings in the viewer other than those vents or holes adjacent the nostrils of a user. This odor essence escape process is continuous once the odor liquid is released. Such non-controlled odor escape comprises a wasteage of the limited odor available and a weakening of the odor strength and duration as detected through the nostrils of a user of the device. This odor wasteage is eliminated with the present invention, whereby in use all the odor is dispensed through odor-passage holes positioned between said odor-producing substance and the nostrils of a user of the improved device as herein disclosed.

A further advantage of the present invention is the fact that the odor may be produced from a carrier or substance which may be a solid or a gel or an absorbent material in which an odor-producing liquid has been impregnated. This distinguishes from the prior structure which can only use an odor-producing liquid in a pouch which flows onto an absorbent material after the pouch is opened mechanically by a knife.

Another advantage of the present invention is the fact that the invention may be applied to different types of hand-held stereo viewers with only minor modification of the existing design to incorporate a cavity into which an odor-producing container may be inserted. A further feature of the present invention is that the structure herein defined makes it possible to simplify and reduce the cost of construction of the odor-dispensing system by eliminating any need for a mechanical container opening means and by other simplifications.

Further, the particular odor to be dispensed may be rapidly changed from one odor to another without a residual odor carryover. Thus the user can both see and smell even a single odor-compatible scene and with a simple change of odor-container look at, and simultaneously smell, a different stereo scene or group of scenes compatible with a completely different odor. In addition, the odor-container in the present invention can be re-sealed after use, or between uses, thus prolonging the useful life of the odor-container and its contents.

Accordingly, the present invention provides a resealable container which is simple in construction and has contained therein an odor-producing substance. This container may be inserted into a cavity in a hand-held stereo viewer as desired to provide an odor compatible with stereo scenes being looked at in the stereo viewer and can be removed and replaced with a fresh odor container or a container producing a different odor. Manual removal of a replaceable seal provides dispensing of the odor produced by the odor-producing substance. The stereo viewer is modified by inclusion of a simply designed cavity to hold the container, preferably adjacent the nostrils of a user of the improved stereo viewing device. The cavity is capable of being enclosed into a compartment. Odor-passage holes capable of dispensing an odor released from the odor-producing substance are positioned between said odor-substance and the nostrils of a person using the modified viewer. These holes are positioned in that portion of a cover of an enclosed cavity in the stereo viewer into which the container is inserted adjacent the nostrils of the user. Alternatively, odor-passage holes are positioned in that portion of the odor-substance container adjacent the nostrils of the user, when said container is inserted into a cavity in or on the modified stereo viewer. The released odor as dispensed is capable of being detected, recognized, and associated with stereo scenes being viewed in the device thereby enhancing the visual comprehensions of the user with an odor associated with said visual comprehensions.

Other objects of the present invention will become apparent upon reading the following specification and referring to the accompanying drawings in which similar characters of reference represent corresponding parts in each of the several views.

Figure 1:
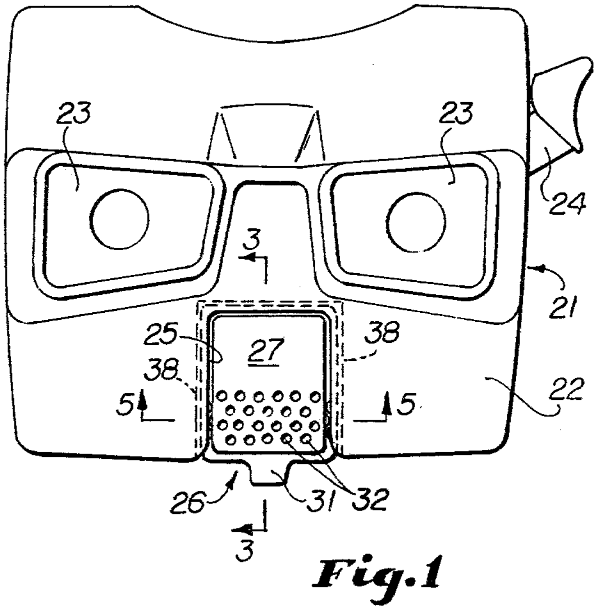
FIG. 1 is a fragmentary front elevational view of one form of stereo viewer as modified to include the present invention.
Figure 6:
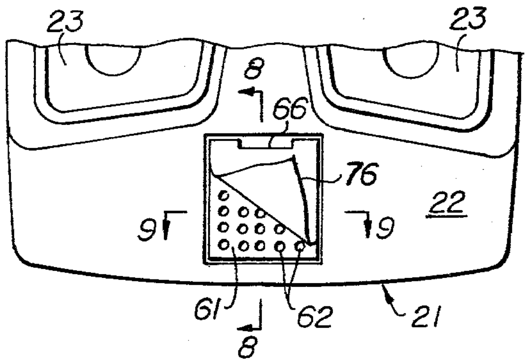
FIG. 6 is a view similar to FIG. 1 of a modified structure incorporated in the same form of viewer as in FIG. 1.

One form of stereo viewer 21 with which the present invention may be used is illustrated in FIGS. 1 and 6, this type being a modification of the commercially available GAF VIEWMASTER. Details of viewer 21 are not believed necessary to an understanding of the invention. However, the device has a housing 22 molded of a plastic material and having eye pieces 23 through which the user views scenes on a rotatable disc (not shown) there being pairs of pieces of film or scenes, one piece or scene being viewed through each eye piece 23 which gives the well-known stereo effect. An actuating means such as lever 24 is used to rotate the disc in a manner well understood and not herein illustrated.

Figure 2:
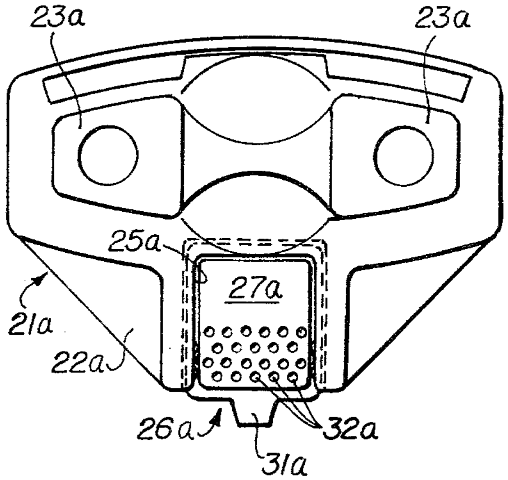
FIG. 2 is a view similar to FIG. 1 of another form of stereo viewer as modified to include the present invention.
Figure 3:
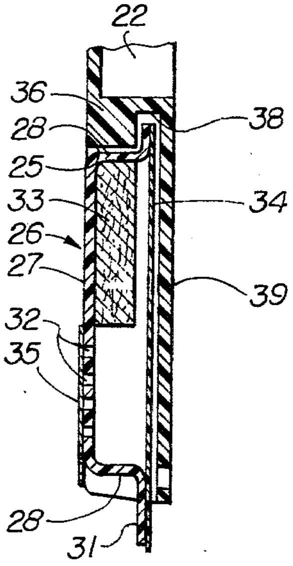
FIG. 3 is a sectional view taken substantially along the line 3—3 of FIG. 1 in enlarged scale.
Figure 7:
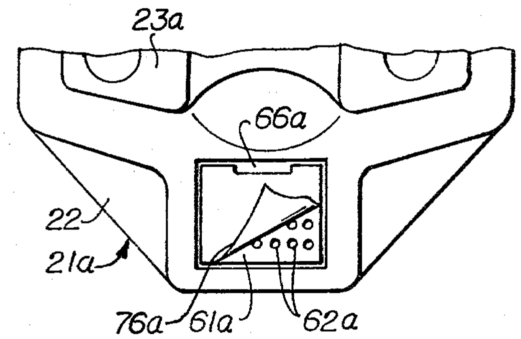
FIG. 7 is a view similar to FIG. 2 of a modified structure incorporated in the same form of viewer as in FIG. 2.

FIGS. 2 and 7 show another type of viewer, this type being a modification of the commercially available KENNER SEE-A-SHOW viewer, wherein an elongated strip having pairs of illustrations or scenes is pulled through the device. Again, details of construction are not believed necessary to an understanding of this invention. The same reference numerals followed by subscript "a" are used to designate corresponding parts in the modification of FIGS. 2 and 7. The container *26a* of FIG. 2 is the same as that used in FIG. 1, while the container *46a* of FIG. 7 is the same as that used in FIG. 6.

In either of the modifications of FIGS. 1, 2, 6 and 7, and in any viewer for a similar purpose or even a viewer having one-dimensional scenes, a container 26 or 46 in accordance with the present invention is used. Container 26 is preferably formed of foil or plastic or other inexpensive composition being resistant to the passage of odor. It has a bottom 27, four sides 28, and each side 28 has a peripheral flange 29 projecting outwardly. Within the container 26 is aroma producing substance 33 here shown as a pad impregnated with an odor-producing liquid well understood in this field. Instead of the pad shown in the accompanying drawings, a solid or a gel odor-producing substance may be enclosed in the container 26. The details of the aroma-producing substance form no part of the present invention except in their diversity.

It will be understood that many different odors may be used in conjunction with the present invention, particularly those compatible or closely associated with scenes being presented in the viewer. Indeed, when used, an aroma compatible with stereo scenes being viewed is normally and desirably dispensed.

Figure 4:
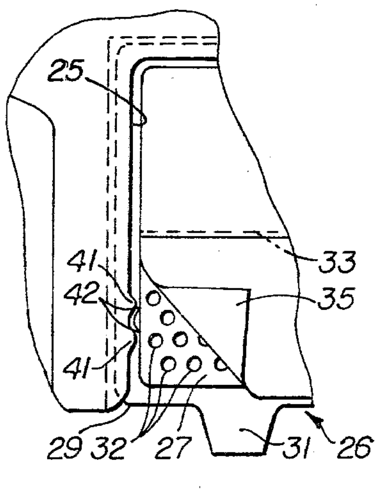
FIG. 4 is a fragmentary elevational view in enlarged scale of a portion of the structure of either FIG. 1 or FIG. 2.
Figure 5:
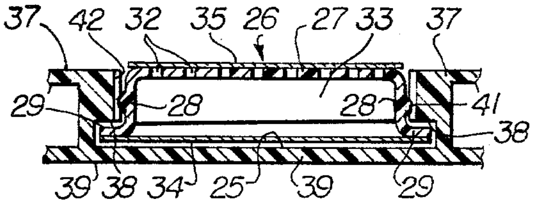
FIG. 5 is a sectional view taken substantially along the line of 5—5 of FIG. 1.

A cover 34 is secured to the flanges 29 after the odor-producing material 33 has been deposited within the container. A tab 31 projects beyond one of the flanges 29 in order to grip the container 26 when it is desired to remove same. Vent holes or odor-passage holes 32 are formed in the bottom 27 preferably in that portion of bottom 27 adjacent to tab 31. Replaceable seal 35, which may be secured to bottom 27 by adhesive, covers vent holes 32. When the container 26 has been installed or prior to such installation, as hereinafter described, the seal 35 is peeled off, as shown in FIG. 4, to dispense an odor. When viewing is completed, the seal 35 may be replaced.

Preferably, the housing 22 of viewer 21 is modified with a cavity 25 to receive the container 26, although an attachment to a viewer housing (as in *21a*) may be employed to receive the container 26. As illustrated herein, the cavity 25 is formed with walls at the top 36, sides 37 and back 39. Grooves 38 are formed in the top 36 and sides 37 to receive the flanges 29. The construction herein illustrated blocks from the remainder of the housing 22 any odor vapors which may be dispensed from the container 26 and all such odor is dispensed through odor-passage holes 32. At least one of sides 28 of container 26 is formed with depressions 42 into which detents 41 formed in at least one side wall 37 fit when the container 26 is fully inserted in the viewer 21.

In use of the device, shown in either FIGS. 1 or 2, container 26 is installed by pushing the container 26 up into cavity 25 as viewed in FIGS. 1–4, the flanges 29 sliding into the grooves 38 in side walls 37 and top wall 36. When the container is fully installed the detents 41 snap into the depressions 42 retaining the container 26 in place.

When it is desired to use the device, the seal 35 is manually peeled off exposing the vent holes 32. Odor is thus produced from the odor-producing substance 33 and dispensed adjacent the nose of a user of the modified device. If the device is left unused for a period of time, the seal 35 may be manually replaced. The user also operates the stereo viewer in conventional manner.

To remove container 26, tab 31 is pulled with detents 41 releasing depressions 42. Replacement of the container 26 is thus readily accomplished as is apparent to change odors, or replace, or reuse odors.

Directing attention now to the form of the invention shown in FIGS. 6 and 7, the viewers 21 and *21a* insofar as the viewing portions thereof is concerned are identical with those of FIGS. 1 and 2, respectively. The container 46 used with the modifications of FIGS. 6 and 7 is best illustrated in FIGS. 8, 9, 10 and 11. It is formed of material similar to that used for container 26. It has a bottom 47 and sides 48, the sides having outward extending peripheral flanges 49. Odor material 51 which may be the same or different from that of the preceding modification 33 is installed in the container 46. Replaceable seal 54 is retained by adhesive until the container 46 is to be used. A tab 53 projects from one end of the seal 54 so that it may be easily grasped and pulled off.

Figure 8:
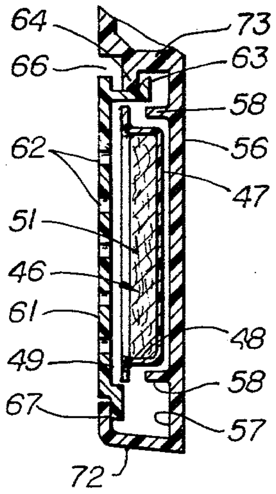
FIG. 8 is a sectional view in enlarged scale taken substantially along the line 8—8 of FIG. 6.
Figure 9:
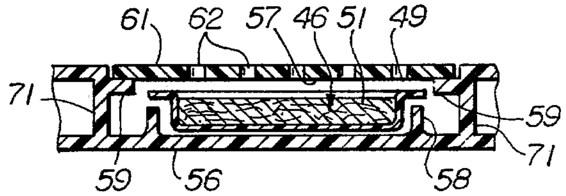
FIG. 9 is a sectional view taken substantially along the line 9—9 of FIG. 6.
Figure 10:
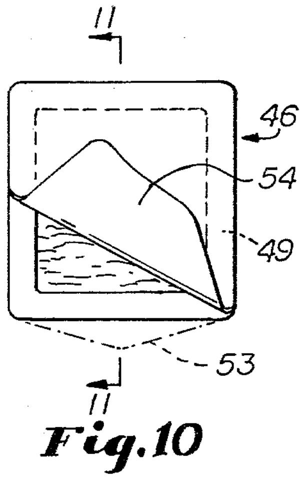
FIG. 10 is a top plan view of a container used in the modification of FIGS. 6–9.
Figure 11:
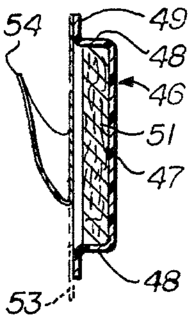
FIG. 11 is a sectional view taken substantially along the line 11—11 of FIG. 10.

As best shown in FIGS. 8 and 9, the housing 22 is modified so that is a back wall 56. Side walls 71, bottom wall 72, top wall 73, and cover 61 define compartment 57 for container 46. Compartment 57 is thus separated from the rest of the viewer 21 for the reasons heretofore set forth. Ridges 58 may project from the wall 56 to hold the container 46 in place. Stops 59 support the two side edges of cover 61 which closes off compartment 57. Cover 61 has vent holes 62 to provide for odor passage from opened container 46 to the atmosphere adjacent the viewer 21. At the top of cover 61 is a hood-like latch 63 which projects internally and locks under a detent 64 formed in the housing 22. At the end of cover 61 opposite latch 63 is a lip 67 which fits under the housing as best shown in FIG. 8. There is a groove 66 at the top in which the user may insert a coin or blade to pry the cover 61 off thereby releasing the latch 63 from the detent 64. Thus the cover 61 is formed and secured in place in a manner similar to the covers for compartments for batteries in pocket calculators or radios and other devices commonly used.

The use of the modification of FIGS. 6–11 differs slightly from that of the preceding modification of FIGS. 2–5. The cover 61 is pried off the housing 22 by inserting a coin in the groove 66 or other means. The replaceable seal 54 is then removed manually from the container 46 and the container is placed in the compartment 57 within the spaces defined by the ridges 58. Thereupon, the cover 61 is snapped back in place in the housing 22. The odor from the odor-producing substance 51 is dispensed through vent holes 62; and as is apparent from FIGS. 6 and 7, the odor is dispensed near the nose of a person using a stereo viewer so modified. Replacement of the container 46 is readily accomplished, as is apparent, to change odors or replenish or reuse odors. If the device is left unattended or not used for a period of time, seal 54 may be manually replaced on container 46.

In an alternative usage, after an opened container 46 is placed in compartment 57 and the cover 61 is snapped back in place in the housing 22, a replaceable seal 76 (similar to seal 35 of FIGS. 1–5) can be used to cover odor-passage holes 62. Thus an odor can be dispensed through removal of replaceable seal 76, or contained as desired by utilizing replaceable seal 76.

What is claimed is:

1. A hand-held device comprising a casing, a stereoscopic viewer in said casing having actuating means, a compartment comprising a cavity formed in said casing, a replaceable container of odor-producing non-liquid substance, said container having a seal, adhesive means on said seal, said seal being manually removable independently of said actuating means by pulling said seal from said container when it is desired to dispense odor into the atmosphere adjacent said stereoscopic viewer, said adhesive means for said seal being capable of being resealed after opening, said container comprising a cup having an open top, an aroma-carrying substance within said cup, said substance being of the group including solids, gels, and liquid-impregnated absorbent material, and in which said seal fits across and detachably adheres to said top, said container being insertable in and removable from said cavity, whereby, upon opening said seal by pulling away said adhesive means, aroma is released from said container to the atmosphere adjacent said viewer, means isolating said compartment from the remainder of said viewer, and a removable cover for said compartment, said container being insertable in and removable from said compartment when said cover is removed, said cover having odor passage holes and a second removable seal for said holes, said second seal being resealable.

2. A hand-held device comprising a casing, a stereoscopic viewer in said casing having actuating means, a compartment comprising a cavity formed in said casing, a replaceable container of odor-producing non-liquid substance, said container having a first and a second seal, adhesive means on said first seal, said first seal being manually removable independently of said actuating means by pulling said first seal from said container when it is desired to dispense odor into the atmosphere adjacent said stereoscopic viewer, said adhesive means for said first seal being capable of being resealed after opening, said container comprising a cup having an open top, a bottom and an aroma-carrying substance within said cup, said substance being of the group including solids, gels, and liquid-impregnated absorbent material, and in which said second seal fits across and adheres to said top, said container being insertable in and removable from said cavity, said cavity being defined by walls of said casing, said walls being formed with grooves facing inwardly of said cavity, said container having flanges fitting into said grooves, said container having a bottom formed with a plurality of vent holes, said first seal initially covering said holes, whereby, upon opening said first seal by pulling away said adhesive means, aroma is released from said container to the atmosphere adjacent said viewer, and means isolating said compartment from the remainder of said viewer.

3. A viewer according to claim 2 which further comprises cooperating detent means on said container and one of said walls detachably holding said container in said cavity.

* * * * *